(12) United States Patent
Muegge

(10) Patent No.: US 11,052,816 B2
(45) Date of Patent: Jul. 6, 2021

(54) LIGHTING APPARATUS FOR VEHICLES

(71) Applicant: HELLA GMBH & CO. KGAA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 111 days.

(21) Appl. No.: 16/375,368

(22) Filed: Apr. 4, 2019

(65) Prior Publication Data

US 2019/0225140 A1 Jul. 25, 2019

Related U.S. Application Data

(63) Continuation of application No. PCT/EP2017/074748, filed on Sep. 29, 2017.

(30) Foreign Application Priority Data

Oct. 4, 2016 (DE) ...................... 10 2016 118 717.8

(51) Int. Cl.
*B60Q 1/26* (2006.01)
*F21S 43/249* (2018.01)
(Continued)

(52) U.S. Cl.
CPC ............ *B60Q 1/2607* (2013.01); *F21S 43/14* (2018.01); *F21S 43/15* (2018.01); *F21S 43/19* (2018.01);
(Continued)

(58) Field of Classification Search
CPC .... B60Q 1/2607; F21S 43/237; F21S 43/249; F21S 43/14; F21S 43/27; F21S 43/19; F21S 43/245; F21S 43/15; F21S 43/26
See application file for complete search history.

(56) References Cited

U.S. PATENT DOCUMENTS

| 6,976,774 B2 | 12/2005 | Reiss |
| 10,222,530 B2 | 3/2019 | Schiccheri et al. |

(Continued)

FOREIGN PATENT DOCUMENTS

| CN | 1948821 A | 4/2007 |
| DE | 3942151 A1 | 6/1990 |

(Continued)

OTHER PUBLICATIONS

International Search Report dated Dec. 6, 2017 in corresponding application PCT/EP2017/074748.

*Primary Examiner* — Anabel Ton
(74) *Attorney, Agent, or Firm* — Muncy, Geissler, Olds & Lowe, P.C.

(57) ABSTRACT

A lighting apparatus for a vehicle, having a number of light sources which are arranged spaced apart from one another in a row along a distribution direction, having an elongate light guiding element arranged upstream of the light sources in the main emission direction. The elongate light guiding element extending in integral fashion along a longitudinal direction that runs parallel to the distribution direction, wherein the light guiding element has a light input face on a side facing the light sources and a light output face on a side facing away from the light sources. The light output face has a lens-shaped contour, wherein the light guiding element is embodied as an elongate lens. At least one base side of the light output face extends continuously from a first end face of the elongate lens to a second end face of the same.

19 Claims, 3 Drawing Sheets

(51) Int. Cl.
*F21S 43/20* (2018.01)
*F21S 43/245* (2018.01)
*F21S 43/15* (2018.01)
*F21S 43/27* (2018.01)
*F21S 43/19* (2018.01)
*F21S 43/237* (2018.01)
*F21S 43/14* (2018.01)

(52) U.S. Cl.
CPC ........... *F21S 43/237* (2018.01); *F21S 43/245* (2018.01); *F21S 43/249* (2018.01); *F21S 43/26* (2018.01); *F21S 43/27* (2018.01)

(56) References Cited

U.S. PATENT DOCUMENTS

| | | | |
|---|---|---|---|
| 2003/0086276 A1* | 5/2003 | Ohtsuka | B60Q 1/2696 362/511 |
| 2015/0151674 A1 | 6/2015 | Hsu | |
| 2016/0091162 A1* | 3/2016 | Dubosc | B60Q 1/0058 362/511 |
| 2018/0306400 A1* | 10/2018 | Muegge | G03H 1/2205 |

FOREIGN PATENT DOCUMENTS

| | | |
|---|---|---|
| DE | 20211305 U1 | 10/2002 |
| DE | 102013104176 A1 | 10/2014 |
| DE | 102013107355 A1 | 1/2015 |
| EP | 1510400 A2 | 3/2005 |
| EP | 2824384 A1 | 1/2015 |
| JP | 2015197988 A | 11/2015 |
| WO | WO2015075668 A1 | 5/2015 |

\* cited by examiner

LIGHTING APPARATUS FOR VEHICLES

This nonprovisional application is a continuation of International Application No. PCT/EP2017/074748, which was filed on Sep. 29, 2017, and which claims priority to German Patent Application No. 10 2016 118 717.8, which was filed in Germany on Oct. 4, 2016, and which are both herein incorporated by reference.

BACKGROUND OF THE INVENTION

Field of the Invention

The present invention relates to a lighting apparatus for vehicles, having a plurality of light sources which are arranged spaced apart from one another in a row along a distribution direction, having an elongate light guiding element arranged upstream of the light sources in the main emission direction, said elongate light guiding element extending in integral fashion along a longitudinal direction that runs parallel to the distribution direction, wherein the light guiding element has a light input face on a side facing the light sources and a light output face on a side facing away from the light sources, wherein the light output face has a lens-shaped contour.

Description of the Background Art

A lighting apparatus for vehicles, having a number of light sources, which are associated with an elongate light guiding element, is known from DE 10 2013 107 355 A1, which is incorporated herein by reference. The light guiding element includes a plurality of lens elements, which have a light input face and a light output face arranged upstream of the lighting apparatus in the main emission direction. At least two light sources are positioned at the light input face of the lens elements, so that light can be emitted via the particular light output face of the lens elements, said light output face having a lens-shaped contour, to produce an elongated light signature or light distribution. The lens elements are arranged stepwise next to one another, so that the lens elements are spatially separated from one another and in each case display the light emitted by the light sources only for light sources arranged directly at the light input face. The lens segments are thus each associated with the light sources arranged directly behind them. The lens elements delimited from one another, to which different light sources are assigned, results in an illumination with areas of different brightness arranged in the longitudinal direction of the lighting apparatus on a cover lens arranged upstream in the main emission direction, so that a viewer can deduce the segmentation of the elongate light guiding element.

SUMMARY OF THE INVENTION

It is therefore an object of the present invention to refine a lighting apparatus for vehicles such that the homogeneity of a linear illumination is improved, wherein a homogeneous linear appearance is established from the outside for the viewer.

In an exemplary embodiment, the invention provides a light guiding element that is embodied as an elongate lens, wherein at least one base side of the light output face extends continuously from a first end face of the elongate lens to a second end face of the same and wherein the first end face of the elongate lens is arranged in the region of a first end-side light source of the row of light sources and the second end face of the elongate lens is arranged in the region of a second end-side light source of the same row of light sources.

The elongate light guiding element can be formed as an elongate lens which extends continuously, i.e., without interruption, with a homogeneous or continuous base side of a light output face in the longitudinal direction. The number and light intensity of the light sources arranged on a light input side of the elongate lens can be selected depending on the desired brightness of the illumination, for example, on an upstream cover lens. Advantageously, the invention thus enables a homogenized illumination of a linear light signature or light distribution in a simple manner and can also provide functions with high light intensities, for example, a direction indicator or a brake light, by the defined shaping of the light distribution by means of the light guiding element.

The base side of the light output face of the elongate lens can be arranged in the longitudinal direction parallel to the course or a distribution direction of the light sources. In the transverse direction, the base side of the light output face has an optical profile. The desired homogeneous light signature is generated by means of the optical profile. A homogeneous linear contour of the signal function can be provided due to the parallel course of the light output face or the base side of the light output face to the distribution direction of the light sources.

The light input face can extend continuously and with a same transverse profile along the elongate lens. A "long lens" which has no discontinuities or no jumps in the longitudinal direction thereof is thus formed as a light guide in the main emission direction in front of the light sources.

The light sources can be arranged at the same distance from one another in the distribution direction. The greater the number of light sources or the closer the light sources are to one another, the greater the brightness or homogenization of the light function that can be provided. Light sources, preferably LED light sources, with the same color can be used for an intended light function, for example, a tail light, or light sources of different colors arranged alternately and/or in sections in the distribution direction of the light sources can be used for providing a double or multiple function.

The light input face of the elongate lens can have a curvature. A distance of the light input face to the row of light sources is smaller than a distance of the light output face of the elongate lens to a cover lens arranged in the main emission direction in front of the same. As a result of the curvature of the light input face, light shaping can already take place when the light enters the elongate lens. The curvature is dependent on the distance of the light input face to the light output face or the height of the lens in order to direct as much light as possible of the light source to the light output face.

The elongate lens or the row of light sources can run in a rectilinear and/or arcuate manner. The course can be adapted to body flanges or edges of the vehicle.

The cover lens can be disposed on the rear side of a cover chamber, which is formed by a cover frame with a translucent cover surface extending transversely to the main emission direction and with opaque screen webs extending in the main emission direction. Advantageously, a depth effect of the linear lighting apparatus can be created thereby.

A fastener can be molded lengthwise onto the elongate lens, so that the elongate lens can be easily mounted on adjacent housing parts of the lighting apparatus.

The base side of light output face of the elongate lens can have a scattering optics structure. In this way, a greater scattering of the light can be effected and, advantageously, the homogeneity of the illumination surface can be further improved. The optics structure can be embodied as a refractive optics, for example, pillow or stripe optics, or as a very small diffractive optics, which produces a diffuse appearance.

The cover lens can be provided as a diffuse cover lens with a volume-scattering material or as a crystal-clear cover lens with scattering surface optics. As a result, the elongate lighting apparatus can advantageously have different appearances or designs.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
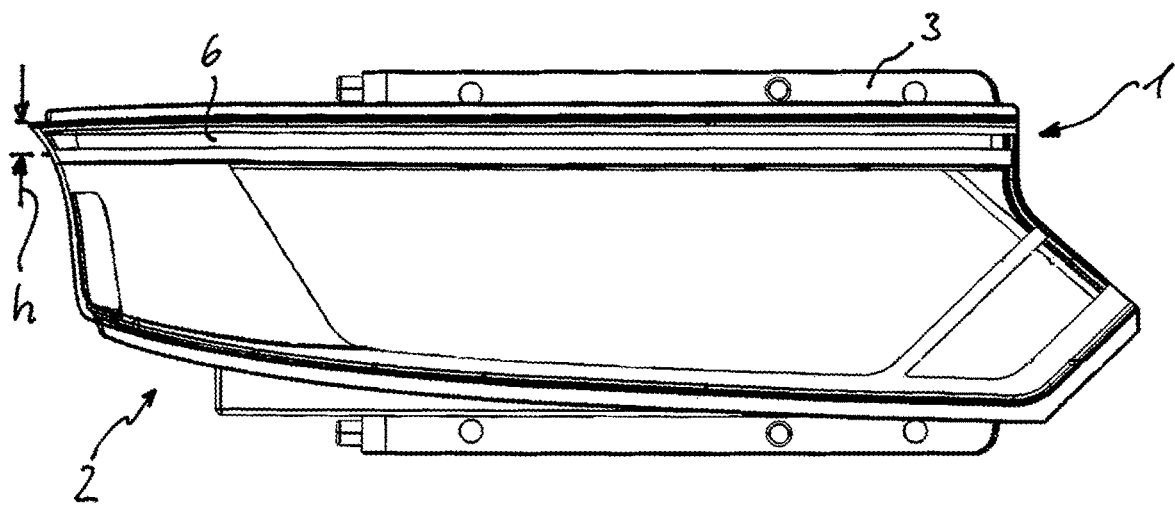
FIG. 1 is a front view of a rear light.

A lighting apparatus of the invention for vehicles can be used in a rear region of the motor vehicle, for example, for generating a tail light, brake light, or flashing light function. Alternatively, the lighting apparatus can also be used in the front region of the vehicle for generating signal light functions, such as, for example, daytime running lights, flashing lights, or the like.

According to an embodiment of the invention according to FIGS. 1 to 5, the lighting apparatus is designed as a signal light 1, which is disposed in an upper region of a rear light 2 of the vehicle. Signal light 1 is made elongate and extends substantially in the horizontal direction along an edge of a housing 3 of the rear light 2. Housing 3 of rear light 2 is made cup-shaped, wherein a front opening of housing 3 is closed by a cover frame 4. Rear light 2 extends in an elongate lamp chamber 5, which in the present exemplary embodiment extends in the horizontal direction and which is covered by an elongate segment 6 of cover frame 4. It thus forms a narrow signal function. Elongate segment 6 of lamp chamber 5 has a height h in the range of 3 mm to 10 mm.

Figure 2:
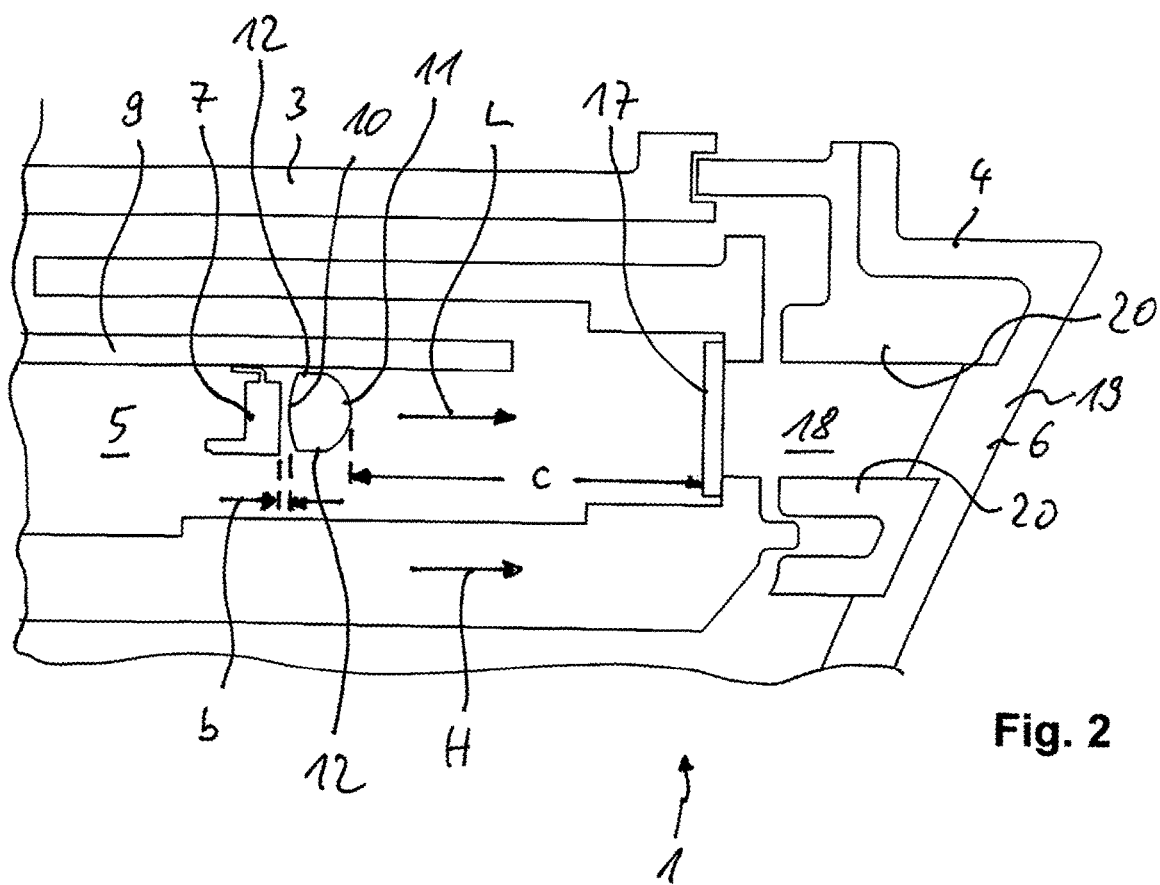
FIG. 2 shows a vertical section through an upper region of the rear light, in which a plurality of light sources and an elongate lens element extend.
Figure 3:
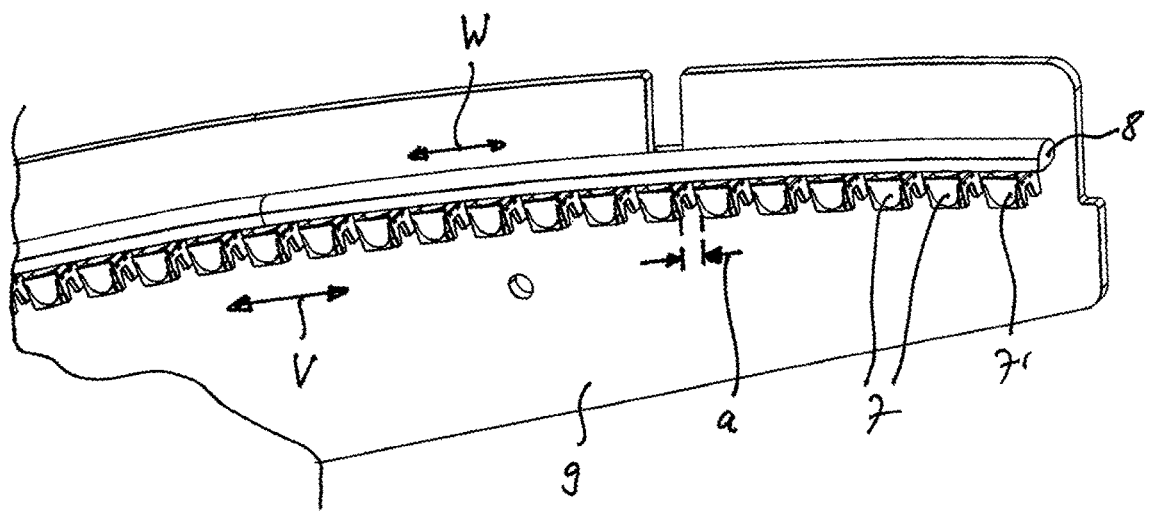
FIG. 3 is a bottom view of a lamp chamber in which the light sources and the elongate lens extend.
Figure 4:
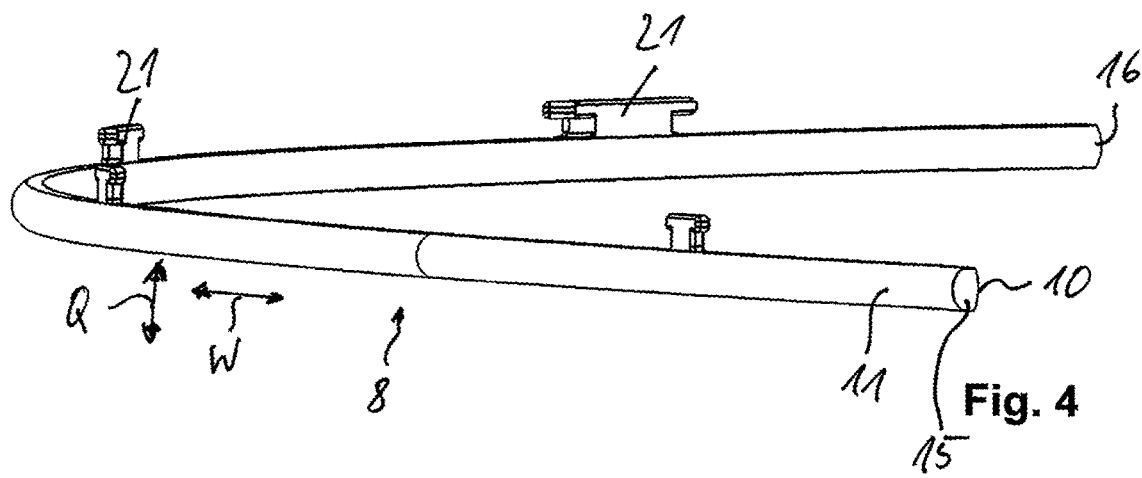
FIG. 4 is a side view of the elongate lens.
Figure 5:
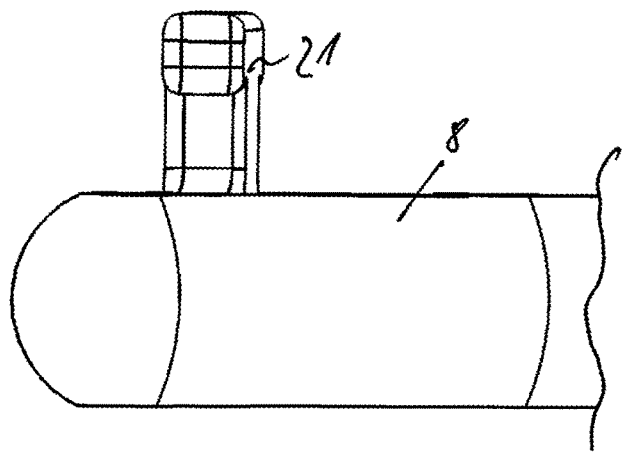
FIG. 5 is an enlarged partial view of the elongate lens with a molded-on fastener.

As can be seen from FIGS. 2 and 3, signal light 1 has a plurality of light sources 7, which are arranged next to one another in a row in a distribution direction V. Adjacent light sources 7 are arranged at a distance 'a' from one another which is constant. This means that all light sources 7 are arranged at the same distance 'a' from neighboring light sources 7.

The row of light sources 7 is assigned, as a light guiding element, an elongate lens 8 which extends along a longitudinal direction W. As can be seen from FIG. 3, the longitudinal direction W of elongate lens 8 runs parallel to the distribution direction V of the row of light sources 7, so that elongate lens 8 runs parallel to the row of light sources 7.

Light sources 7 are formed as side-mounted LED light sources 7 (SideLED), which are mounted laterally on a printed circuit board 9. Circuit board 9 can be formed flat as a rigid circuit board, so that light sources 7 can be arranged in a straight row. Alternatively, circuit board 9 can also be designed to be flexible, so that light sources 7 run along an arc; i.e., the row of light sources 8 extend in an arcuate fashion in a two-dimensional plane or three-dimensionally.

In the present exemplary embodiment, light sources 7 are mounted on the underside on circuit board 9, wherein light L is emitted in the main emission direction H or in the direction of elongate segment 6 of cover frame 4.

As can be seen from FIG. 2, elongate lens 8 is arranged at a distance b from the row of light sources 7, or from light source 7 arranged directly counter to the main emission direction H. On a side facing light sources 7, elongate lens 8 has a light input face 10 and a light output face 11 on a side facing away from light sources 7. Light input face 10 and light output face 11 in the present exemplary embodiment are connected by parallel side faces 12 extending opposite to one another.

In the first exemplary embodiment according to FIGS. 1 to 5, light output face 11 of elongate lens 8 is formed smooth or continuous. According to an alternative embodiment of the invention according to FIG. 6, an elongate lens 8' can be provided which has a light output face 11' whose surface has prism segments 13. The surface of light output face 11' extends thus ribbed in the longitudinal direction W of elongate lens 8'. Prism segments 13 rise from a base side 14 of light output face 11', which corresponds to the contouring of light output face 11 of elongate lens 8. Said base side 14 of light output face 11' or light output face 11 of elongate lens 8 has a lenticular contour which runs continuously, i.e., without steps or an offset, from a first end face 15 of elongate lens 8, 8' to a second end face 16 thereof. First end face 15 of elongate lenses 8, 8' is disposed in the region of a first end-side light source 7' of the row of light sources 7 and second end face 16 of the same in the region of a second end-side light source 7 of the row of light sources 7.

Figure 6:
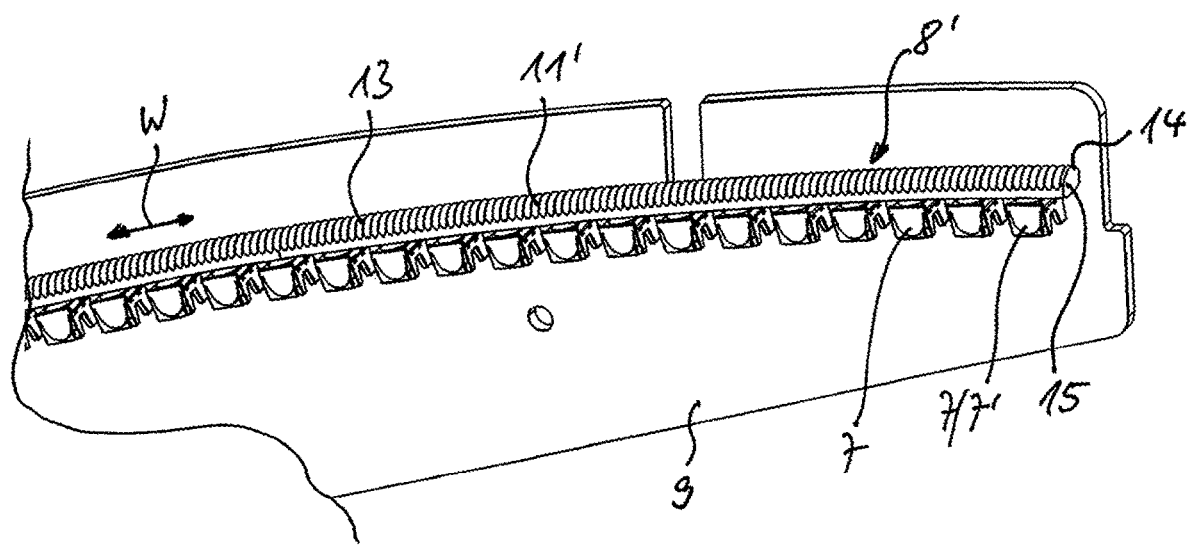
FIG. 6 is a bottom view of the lamp chamber with light sources and the elongate lens according to an embodiment of the invention.

According to an alternative embodiment of the invention according to FIG. 6, an elongate lens 8' can be provided with a scattering optics structure.

Elongate lenses 8, 8' thus correspond to a lens which extends in longitudinal direction W and whose length corresponds to a length of the row of light sources 7. Elongate lens 8, 8' corresponds to a continuous extension of a lens which is associated with only a single light source 7 or which is arranged in the main emission direction H in front of a single light source 7. The transverse extent of elongate lens 8, 8' corresponds to an imaginary segment of elongate lens 8, 8', which is upstream of a single light source 7, 7'. The transverse extent Q, i.e., the extent in the transverse direction, is equal or constant over the entire length of elongate lens 8, 8'. Because elongate lens 8 according to FIG. 4 has a smooth surface, not only the base side but also the top face of elongate lens 8 run continuously in the longitudinal direction W. Base side 14 of elongate light output face 11 corresponds to the surface thereof. In the case of light output face 11' according to FIG. 6, only base side 14 runs continuously in the longitudinal direction W, whereas the surface structure (prism elements 13) extends in longitudinal direction W regularly or without offset.

Base side 14 or light output face 11 of elongate lens 8 extends parallel to the longitudinal direction W thereof or parallel to the distribution direction V of the row of light sources 7. Base side 14 and the surface structuring (prism elements 13) of light output face 11' of elongate lens 8' extend in longitudinal direction W of the same or parallel to the distribution direction V of the row of light source 7.

In the transverse direction Q, light output face 11, 11' has an optical cross profile, which is convex in the present exemplary embodiment. The optical cross profile extends continuously in the longitudinal direction W of elongate lens 8, 8'.

The same components or component functions of the two exemplary embodiments are provided with the same reference numerals.

As can be seen in particular from FIG. 2, light input face 10 of elongate lenses 8, 8' has a curvature. There is a distance b between light input face 10 and light source 7, a distance which is smaller than a distance c of elongate lens 8, 8' to a cover lens 17. Cover lens 17 is arranged on a rear side of a cover chamber 18, which is delimited by a light-permeable cover surface 19 of cover frame 4 and by screen webs 20 projecting from cover surface 19 counter to the main emission direction H.

Elongate lens 8, 8' is designed in such a way that the light emitted by light sources 7 is focused in cover chamber 18 and cover lens 17 is illuminated.

According to an alternative embodiment of the invention, which is not shown, light output face 11, 11' can also be formed as a free-form surface.

Cover lens 17 is formed to be translucent. It can include a volume-scattering material as a diffuse cover lens. Alternatively, it can be provided as a crystal-clear cover lens with scattering surface optics. The scattering surface optics can be designed as a pillow or stripe optics with dimensions greater than 0.5 mm or as a micro-optics with dimensions smaller than 0.5 mm. Alternatively, the scattering surface optics can also have diffractive elements with dimensions in the pm or nm range. Alternatively, the cover lens can also be provided with an erosion, etching, or laser structuring.

Cover lens 17 can be formed by injection molding with a wall thickness greater than 1.5 mm, preferably 2 mm to 2.5 mm. It can have, for example, a scattering foil with structuring or diffractive scattering optics. The scattering foil can have a thickness of less than 1 mm, preferably between 0.25 mm and 0.75 mm. It can be designed as a flat planar strip and be attached by gluing or welding or clamping to cover frame 4. Alternatively, cover lens 17 can be formed as a deep-drawn part to improve the rigidity and handling in the mounting process.

Elongate lens 8, 8' preferably has a fastener 21 which protrude transversely to longitudinal direction W, therefore, in the transverse direction Q, from long lens 8, 8'. Fastener 21 can be integrally formed on elongate lens 8, 8'. They enable attachment of elongate lens 8, 8' to a housing part of rear light 2 or to circuit board 9.

A scattering optics structure of elongate lens 8, 8' can be formed, for example, as an erosion, etching, or laser structure. Alternatively, the surface of light output face 11 can also be provided with a diffractive scattering or diffuser optics that run in the pm or nm range, wherein the scattering elements run in the pm or nm range.

Alternatively, the scattering optics structure can also be designed as a pillow or stripe optics in the mm range or as freeform optics.

Elongate lens 8, 8' can be formed, for example, as an extruded part, which is produced by extrusion. Elongate lens 8, 8' does not have a division into individual lens sections that is matched to the number of light sources 7 and/or the position of light sources 7.

The row of light sources 7 can have light sources 7 of a single color, for example, red for generating a tail light function or yellow for generating a flashing light function. Alternatively, the row of light sources 7 can also alternately have light sources of different color emission, for example, red and yellow, so that a tail light and/or flashing light function can be generated as a function of the activation of light sources 7 emitting different light colors.

For example, light sources 7 arranged in a row can also be activated so that signal light 1 conveys an animated appearance. For example, the flashing light function can be formed as a sweeping turn signal in which light sources 7 emitting yellow light are turned on successively in the longitudinal direction W until all light up, after which they are then switched off together.

According to an alternative embodiment of the invention, which is not shown, light sources 7 can also be formed as RGB LEDs, so that signal light 1 generates different colors, such as red, yellow, white, blue, and purple. This can be used to generate additional signal functions on the vehicle, for example, the signaling of locking or unlocking of the vehicle.

The light sources are preferably designed as LED light sources.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for vehicles, the lighting apparatus comprising:
    a plurality of light sources that are arranged spaced apart from one another in a row along a distribution direction; and
    an elongate light guiding element arranged upstream of the light sources in the main emission direction and arranged spaced at a distance from the plurality of light sources, the elongate light guiding element extending in integral fashion along a longitudinal direction that runs substantially parallel to the distribution direction,
    wherein the light guiding element has a light input face on a side facing the light sources and a light output face on a side facing away from the light sources,
    wherein the light output face has a lens-shaped contour,
    wherein the light guiding element is an elongate lens,
    wherein at least one base side of the light output face extends continuously from a first end face of the elongate lens to a second end face of the elongate lens, and
    wherein the first end face of the elongate lens is arranged in a region of a first end-side light source of a row of light sources and the second end face of the elongate lens is arranged in a region of a second end-side light source of a same row of light sources.

2. The lighting apparatus according to claim 1, wherein the base side of the light output face runs in the longitudinal direction substantially parallel to the distribution direction of the row of light sources, and wherein the light output face in the transverse direction has an optical transverse profile so as to generate a narrow, elongate light distribution for a linear light function.

3. The lighting apparatus according to claim 1, wherein the light input face runs continuously in a distribution direction of the rows of light sources and in the longitudinal direction of the elongate lens.

4. The lighting apparatus according to claim 1, wherein the light sources are arranged at a same distance from one another in the distribution direction, and
wherein the light sources emit light of the same color or wherein LED light sources of different colors are provided as light sources alternately or in sections in the distribution direction to realize a double or multiple light function.

5. The lighting apparatus according to claim 1, wherein the light input face of the elongate lens has a curvature, and
wherein the light input face is arranged at a distance to the row of light sources, the distance being smaller than a distance between the light output face and a cover lens arranged in a main emission in front of the cover lens.

6. The lighting apparatus according to claim 1, wherein the distribution direction of the row of light sources and the longitudinal direction of the elongate lens are rectilinear or arcuate.

7. A lighting apparatus for vehicles, the lighting apparatus comprising:
a plurality of light sources that are arranged spaced apart from one another in a row along a distribution direction; and
an elongate light guiding element arranged upstream of the light sources in the main emission direction, the elongate light guiding element extending in integral fashion along a longitudinal direction that runs substantially parallel to the distribution direction,
wherein the light guiding element has a light input face on a side facing the light sources and a light output face on a side facing away from the light sources,
wherein the light output face has a lens-shaped contour,
wherein the light guiding element is an elongate lens,
wherein at least one base side of the light output face extends continuously from a first end face of the elongate lens to a second end face of the elongate lens,
wherein the first end face of the elongate lens is arranged in a region of a first end-side light source of a row of light sources and the second end face of the elongate lens is arranged in a region of a second end-side light source of a same row of light sources, and
wherein a cover lens is disposed on a rear side of a cover chamber formed by a cover frame with a translucent cover surface terminating in a housing of the lighting apparatus and with opaque screen webs projecting therefrom counter to the main emission direction and running in the longitudinal direction of the elongate lens.

8. The lighting apparatus according to claim 1, wherein the elongate lens has a fastener arranged in the longitudinal direction of the same and which project transversely from the elongate lens.

9. The lighting apparatus according to claim 1, wherein a scattering optics structure rises from the base side of the light output face of the elongate lens.

10. A lighting apparatus for vehicles, the lighting apparatus comprising:

a plurality of light sources that are arranged spaced apart from one another in a row along a distribution direction; and
an elongate light guiding element arranged upstream of the light sources in the main emission direction, the elongate light guiding element extending in integral fashion along a longitudinal direction that runs substantially parallel to the distribution direction,
wherein the light guiding element has a light input face on a side facing the light sources and a light output face on a side facing away from the light sources,
wherein the light output face has a lens-shaped contour,
wherein the light guiding element is an elongate lens,
wherein at least one base side of the light output face extends continuously from a first end face of the elongate lens to a second end face of the elongate lens,
wherein the first end face of the elongate lens is arranged in a region of a first end-side light source of a row of light sources and the second end face of the elongate lens is arranged in a region of a second end-side light source of a same row of light sources, and
wherein the cover lens is a diffuse cover lens with a volume-scattering material or a crystal-clear cover lens with a scattering surface optics.

11. A lighting apparatus, comprising:
a plurality of light sources arranged spaced apart from one another in a row along a distribution direction; and
an elongate lens arranged upstream of the plurality of light sources in the main emission direction and arranged spaced at a distance from and parallel to the plurality of light sources, the elongate lens comprising:
a light input face on a side facing the plurality of light sources; and
a light output face on a side facing away from the plurality of light sources, the light output face having a base side extending continuously from a first end face of the elongate lens to a second end face of the elongate lens.

12. The lighting apparatus according to claim 11, further comprising a cover lens disposed on a rear side of a cover chamber formed by a cover frame.

13. The lighting apparatus according to claim 12, wherein the cover frame has a translucent cover surface terminating in a housing of the lighting apparatus.

14. The lighting apparatus according to claim 13, wherein the cover frame has opaque screen webs projecting therefrom counter to the main emission direction and running in the longitudinal direction of the elongate lens.

15. The lighting apparatus according to claim 11, wherein the cover lens is a diffuse cover lens with a volume-scattering material or a crystal-clear cover lens with a scattering surface optics.

16. The lighting apparatus according to claim 11, wherein the plurality of light sources are mounted laterally on a printed circuit board.

17. The lighting apparatus according to claim 16, wherein the plurality of light sources are mounted on an underside of the printed circuit board.

18. The lighting apparatus according to claim 11, wherein the plurality of light sources comprise side-mounted LED light sources mounted laterally on a printed circuit board.

19. The lighting apparatus according to claim 11, wherein the elongate lens is arranged directly counter to the main emission direction.

* * * * *